(12) United States Patent
Kim et al.

(10) Patent No.: US 7,801,006 B2
(45) Date of Patent: *Sep. 21, 2010

(54) HIGH-DENSITY READ-ONLY OPTICAL DISC, AND OPTICAL DISC APPARATUS AND METHOD USING THE SAME

(75) Inventors: Jin Yong Kim, Kyunggi-do (KR); Sang Woon Suh, Seoul (KR); Kyung Chan Park, Seoul (KR); Yun Sup Shin, Sungnam-si (KR)

(73) Assignee: LG Electronics, Inc., Seoul (KR)

( * ) Notice: Subject to any disclaimer, the term of this patent is extended or adjusted under 35 U.S.C. 154(b) by 913 days.

This patent is subject to a terminal disclaimer.

(21) Appl. No.: 10/426,020

(22) Filed: Apr. 30, 2003

(65) Prior Publication Data

US 2003/0227853 A1 Dec. 11, 2003

(30) Foreign Application Priority Data

| May 1, 2002 | (KR) | ............... 10-2002-0023983 |
| Sep. 10, 2002 | (KR) | ............... 10-2002-0054705 |
| Dec. 6, 2002 | (KR) | ............... 10-2002-0077358 |

(51) Int. Cl.
*G11B 7/005* (2006.01)

(52) U.S. Cl. ............ 369/59.25; 369/44.26; 369/53.21; 369/44.13; 369/275.1; 369/275.3; 369/275.4; 369/277; 369/278

(58) Field of Classification Search ............ 369/275.4, 369/275.3, 275.2, 44.26, 44.29, 53.21, 44.13, 369/53.28, 275.1, 277, 278
See application file for complete search history.

(56) References Cited

U.S. PATENT DOCUMENTS 4,748,609 A 5/1988 Yonezawa et al.

4,907,216 A * 3/1990 Rijnsburger ............... 369/44.39

(Continued)

FOREIGN PATENT DOCUMENTS

CN 1313599 9/2001

(Continued)

OTHER PUBLICATIONS

Machine Translation of Japan Publication No. 10222875 by Akihiko, Shimizu on Feb. 7, 1997.*

(Continued)

*Primary Examiner*—Wayne R Young
*Assistant Examiner*—Linh T Nguyen
(74) *Attorney, Agent, or Firm*—Harness, Dickey & Pierce, P.L.C.

(57) ABSTRACT

A high-density read-only optical disc, and an optical disc apparatus and method using the same. The apparatus and method record data on a lead-in area of a high-density read-only optical disc such as a BD-ROM (Blu-ray disc ROM (Read Only Memory)) in the form of pre-pit strings associated with an HFM (High-Frequency Modulated) groove applied to a BD-RW (Blu-ray Disc Rewritable). Moreover, the apparatus and method continuously apply the same tracking servo operation to an entire area of the same high-density read-only optical disc or rewritable optical disc. Therefore, the apparatus and method can simplify an algorithm for controlling a plurality of tracking servo operations, and avoid an increased size of the optical disc apparatus.

20 Claims, 12 Drawing Sheets

U.S. PATENT DOCUMENTS

| | | | |
|---|---|---|---|
| 5,051,998 | A | 9/1991 | Murai et al. |
| 5,513,260 | A | 4/1996 | Ryan |
| 5,538,773 | A | 7/1996 | Kondo |
| 5,572,507 | A * | 11/1996 | Ozaki et al. ............... 369/53.21 |
| 5,706,047 | A | 1/1998 | Lentz et al. |
| 5,706,268 | A * | 1/1998 | Horimai ................. 369/59.12 |
| 5,724,327 | A | 3/1998 | Timmermans et al. |
| 5,737,286 | A | 4/1998 | Timmermans et al. |
| 5,936,933 | A * | 8/1999 | Miyamoto et al. ........ 369/275.3 |
| 5,940,364 | A * | 8/1999 | Ogata et al. .............. 369/275.4 |
| 6,014,348 | A | 1/2000 | Kim |
| 6,070,799 | A | 6/2000 | Ashe |
| 6,081,785 | A | 6/2000 | Oshima et al. |
| 6,128,272 | A * | 10/2000 | Horimai et al. .......... 369/44.26 |
| 6,144,625 | A * | 11/2000 | Kuroda et al. ............ 369/44.27 |
| 6,266,299 | B1 | 7/2001 | Oshima et al. |
| 6,353,890 | B1 | 3/2002 | Newman |
| 6,532,206 | B2 | 3/2003 | Muramatsu et al. |
| 6,535,477 | B1 * | 3/2003 | Muramatsu et al. ....... 369/275.4 |
| 6,546,490 | B2 | 4/2003 | Sako et al. |
| 6,549,498 | B1 * | 4/2003 | Inoue et al. ............... 369/47.28 |
| 6,580,678 | B2 | 6/2003 | Kondo et al. |
| 6,603,720 | B1 | 8/2003 | Kuroda et al. |
| 6,603,732 | B2 | 8/2003 | Tosaki et al. |
| 6,608,804 | B2 | 8/2003 | Shim |
| 6,671,249 | B2 * | 12/2003 | Horie ....................... 369/275.3 |
| 6,683,844 | B2 | 1/2004 | Kuroda |
| 6,694,023 | B1 | 2/2004 | Kim |
| 6,707,774 | B1 | 3/2004 | Kuroda et al. |
| 6,707,785 | B1 * | 3/2004 | Kato ....................... 369/275.3 |
| 6,930,977 | B1 | 8/2005 | Kondo et al. |
| 7,012,859 | B2 | 3/2006 | Park |
| 7,014,815 | B1 * | 3/2006 | Worthington et al. .... 422/82.05 |
| 7,028,011 | B1 | 4/2006 | Ha et al. |
| 7,035,172 | B1 | 4/2006 | Murata |
| 7,050,383 | B2 | 5/2006 | Nakajima et al. |
| 7,061,850 | B1 | 6/2006 | Irie et al. |
| 7,092,335 | B2 | 8/2006 | Horie |
| 7,215,610 | B2 | 5/2007 | Sako et al. |
| 7,280,461 | B2 | 10/2007 | Endoh |
| 7,302,588 | B2 | 11/2007 | Sako et al. |
| 2001/0007545 | A1 | 7/2001 | Ueda et al. |
| 2001/0014077 | A1 | 8/2001 | Muramatsu et al. |
| 2001/0038603 | A1 | 11/2001 | Kondo et al. |
| 2002/0001274 | A1 | 1/2002 | Nakajima et al. |
| 2002/0021635 | A1 | 2/2002 | Park et al. |
| 2002/0024898 | A1 | 2/2002 | Kamiyama |
| 2002/0024914 | A1 | 2/2002 | Kobayashi |
| 2002/0027855 | A1 * | 3/2002 | Shishido et al. .......... 369/53.22 |
| 2002/0110067 | A1 * | 8/2002 | Kondo et al. ............. 369/47.54 |
| 2003/0002427 | A1 * | 1/2003 | Lee et al. .................... 369/120 |
| 2003/0002430 | A1 * | 1/2003 | Kim et al. ................. 369/275.4 |
| 2003/0012098 | A1 | 1/2003 | Sako et al. |
| 2003/0048705 | A1 | 3/2003 | Wang et al. |
| 2003/0067849 | A1 | 4/2003 | Mikami |
| 2003/0112736 | A1 | 6/2003 | Muramatsu et al. |
| 2005/0111315 | A1 | 5/2005 | Hwang et al. |
| 2005/0213483 | A1 * | 9/2005 | Tomita et al. ................ 369/278 |

FOREIGN PATENT DOCUMENTS

| | | |
|---|---|---|
| CN | 1384491 | 12/2002 |
| EP | 0 299 573 | 7/1988 |
| EP | 0 545 472 | 11/1992 |
| EP | 0 936 610 A2 | 8/1999 |
| EP | 1 168 312 | 9/2000 |
| EP | 1 065 659 | 1/2001 |
| EP | 1081688 * | 7/2001 |
| EP | 1 189 213 | 3/2002 |
| EP | 1 126 446 | 11/2007 |
| JP | 04-274032 | 9/1992 |
| JP | 08-036803 | 2/1996 |
| JP | 8-087760 | 4/1996 |
| JP | 11-032328 * | 10/1997 |
| JP | 09-305396 | 11/1997 |
| JP | 10-172149 | 6/1998 |
| JP | 10-177767 | 6/1998 |
| JP | 10-302381 | 11/1998 |
| JP | 10-326419 | 12/1998 |
| JP | 11-339268 * | 12/1999 |
| JP | 2000-076141 | 3/2000 |
| JP | 2000-113466 | 4/2000 |
| JP | 2000-123479 | 4/2000 |
| JP | 2000-149414 | 5/2000 |
| JP | 2000-231722 | 8/2000 |
| JP | 2001-014796 | 1/2001 |
| JP | 2001-135021 | 5/2001 |
| JP | 2001-189015 | 7/2001 |
| JP | 2001-216727 | 8/2001 |
| JP | 2001-229547 | 8/2001 |
| JP | 2001-256655 | 9/2001 |
| JP | 2001-325747 | 11/2001 |
| JP | 2001-332031 | 11/2001 |
| JP | 2002-132457 | 5/2002 |
| JP | 2002-182770 | 6/2002 |
| JP | 2002-319245 | 10/2002 |
| JP | 2005-266593 | 9/2005 |
| JP | 2006-337763 | 12/2006 |
| KR | 10-1999-0079395 | 11/1999 |
| KR | 10-0239468 | 1/2000 |
| KR | 10-2001-0085952 | 9/2001 |
| KR | 10-2001-0088053 | 9/2001 |
| KR | 10-2003-0004542 | 1/2003 |
| KR | 10-2003-0030506 | 4/2003 |
| WO | WO 00/45381 | 8/2000 |
| WO | WO 01/11890 | 2/2001 |
| WO | WO 01/88917 | 11/2001 |
| WO | WO 01/95327 | 12/2001 |
| WO | WO 02/01560 | 1/2002 |
| WO | WO 02/37493 | 5/2002 |
| WO | WO 03/094158 | 11/2003 |

OTHER PUBLICATIONS

Search Report (Aug. 19, 2003) for PCT/KR03/00867.
Office Action (dated Mar. 17, 2006) for Chinese Application No. 03809910.1.
Communication (dated circa Nov. 2006) for Japanese Application No. 2004-502291.
Japanese Patent Office Action (dated May 29, 2007), for corresponding Japanese Patent Application No. 2004-502291.
Office Action for International Patent Application No. PCT/KR03/01292 dated Oct. 23, 2003.
Search Report for International Patent Application No. PCT/KR2004/000338 dated May 27, 2004.
Office Action for European Patent Application No. 03736356.1 dated Feb. 17, 2006.
Office Action for U.S. Appl. No. 10/790,031 dated Feb. 22, 2006.
Office Action for U.S. Appl. No. 10/789,992 dated Apr. 10, 2006.
Office Action for U.S. Appl. No. 10/789,992 dated Oct. 12, 2006.
Office Action for U.S. Appl. No. 10/789,992 dated Jul. 12, 2007.
Office Action for Russian Patent Application No. 2004124944/28(027284) dated Jul. 6, 2007.
Office Action for European Patent Application No. 03 736 356.1 dated Oct. 26, 2007.
Office Action for Chinese Patent Application No. 200480007952.0 dated Dec. 7, 2007.
Office Action for U.S. Patent Application No. 10/986,019 dated Jan. 8, 2008.
Office Action for Japanese Patent Application No. 2004-519328 dated Feb. 6, 2008.
Office Action for U.S. Appl. No. 10/780,756 dated Mar. 28, 2008.
Philips Electronics; Formatter for pre-recorded formats, 2004.

Philips Electronics; Formatter for Recordable-Rewritable Formats, 2004.
Memorex White Paper Reference Guide for Optical Media, 2008.
Internet Posting, Understanding the Design of the DVD+Rw and DVD+R Disc Format, 2008.
Internet posting, Addressing Schemes for Optical Discs, 2008.
Office Action for U.S. Appl. No. 10/986,019 dated Sep. 6, 2006.
Office Action for U.S. Appl. No. 10/986,019 dated Apr. 27, 2007.
Office Action for U.S. Appl. No. 10/989,292 dated Apr. 22, 2008.
Office Action for U.S. Appl. No. 10/789,992 dated Apr. 23, 2008.
US Office Action for U.S. Appl. No. 10/986,019 dated Sep. 22, 2008.
Japanese Office Action for JP 2005-214336 dated Sep. 24, 2008.
Office Action for U.S. Appl. No. 10/989,292 dated Dec. 31, 2008.
Office Action for U.S. Appl. No. 11/976,687 dated Feb. 6, 2009.
Office Action for Japanese patent application No. 2005-214336 dated Mar. 10, 2009.
Notice of Allowance for U.S. Appl. No. 10/780,756 dated Mar. 20, 2009.
Satoh, et al., "Key Technology for High Density Rewritable DVD (DVD-RAM)," IEEE Transactions on Magnetics, vol. 34, No. 2, Mar. 1998, pp. 337-342.
Fuji, et al., "Recording and Readout Using Clock Marks Premastered by Groove Wobbling," IEEE Transactions on Magnetics, vol. 36, No. 3, May 2000, pp. 597-603.
Kaneda, Y., "Advanced Optical Disk Mastering and Its Application for Extremely High-Density Magnetic Recording," IEEE Transactions on Industrial Electronics, vol. 42, No. 3, Jun. 1995, pp. 257-262.

Office Action for Japanese patent application No. 2005-210963 dated Jul. 14, 2009.
Office Action for Korean patent application No. 10-2002-0077358 dated Jul. 16, 2009.
Notice of Allowance for U.S. Appl. No. 10/986,019 dated Mar. 23, 2009.
Notice of Allowance for U.S. Appl. No. 10/986,019 dated Aug. 25, 2009.
Office Action for Japanese patent application No. 2006-502712 dated Sep. 1, 2009 (with English translation).
Office Action for related European patent application No. 03721120.8-2210 dated Mar. 14, 2008.
Office Action for related European patent application No. 07023886.0-2210 dated Mar. 25, 2008.
Office Action for related Japanese patent application No. 2005-214336 dated Jun. 3, 2008.
Office Action for related Korean patent application No. 10-2007-0042296 dated Jul. 22, 2008.
Office Action for related Korean patent application No. 10-2002-0023983 dated May 30, 2008.
Office Action for related Russian patent application No. 2004124944 dated Feb. 28, 2008.
Office Action for corresponding Korean patent application No. 10-2002-0037947 dated Sep. 17, 2008.

* cited by examiner

*Biphase modulated HFM groove*

Push / Pull Method

DPD Method

Case 1

Case 2

HIGH-DENSITY READ-ONLY OPTICAL DISC, AND OPTICAL DISC APPARATUS AND METHOD USING THE SAME

BACKGROUND OF THE INVENTION

1. Field of the Invention

The present invention relates to a high-density read-only optical disc on which large-capacity video and audio data are recorded and stored, and an optical disc apparatus and method of using the same.

2. Description of the Related Art

Recently, standardization of a new high-density rewritable optical disc, which can permanently record and store high-quality video data and audio data, e.g., a BD-RW (Blu-ray Disc Rewritable), is rapidly progressing. It is expected that related products will be developed, presented and commercialized in the near future.

With reference to FIG. 1, the structure of a BD-RW is divided into an inner surface, an intermediate surface and an outer surface. The inner surface includes a clamping area, a transition area, a BCA (Burst Cutting Area) and a lead-in area formed in that order. The intermediate and outer surfaces include a data area and a lead-out area, respectively.

The lead-in area is divided into a first guard-1 sub-area ("Guard 1"), a Permanent Information and Control data sub-area ("PIC"), a second guard-2 sub-area ("Guard 2"), an "Info 2" sub-area, an Optimum Power Control sub-area ("OPC"), etc. The first guard-1 sub-area and the PIC subarea are pre-recorded areas where data is previously recorded, whereas the lead-in area, the data area and the lead-out area are rewritable areas on which new data is rewritable.

The PIC sub-area is an area on which disc information is permanently recorded and stored. The disc information is basic information required for recording or reproducing user data on or from the data area. A HFM (High-Frequency Modulated) groove is formed on the PIC sub-area.

As shown in FIG. 2, the HFM groove has disc data modulated by a bi-phase modulation and stored thereon. For example, if the HFM groove is formed in the form of in-phase patterns in a recording section of 36 T, a data value of "1" is recorded on the HFM groove. Further, if the HFM groove is formed in the form of anti-phase patterns in the recording section of 36 T, a data value of "1" is recorded on the HFM groove.

A tracking servo for tracking a signal of the HFM groove, recorded on the PIC sub-area, uses the well-known push/pull method. In this case, an optical disc apparatus as shown in FIG. 3 includes a 2-element PD (photodiode) 12 for converting light received through an OL (Objective Lens) 10 and a CL (Collimating Lens) 11 into electric signals Ea and Eb; and a differential amplifier 13 for carrying out a differential amplification for the electric signals Ea and Eb outputted by the 2-element PD 12 and then outputting a tracking error signal TE=(Ea−Eb).

The optical disc apparatus performs a tracking servo operation by referring to the tracking error signal TE=(Ea−Eb). Moreover, in relation to a wobbled groove formed on the data area and the lead-in area, the optical disc apparatus enables a tracking servo operation for the wobbled groove to be carried out by referring to the tracking error signal TE=(Ea−Eb).

A BD-ROM (Blu-ray disc ROM (Read Only Memory)), in contrast with the above-described BD-RW, is a high-density read-only optical disc. As shown in FIG. 4, a structure of the BD-ROM is divided into an inner surface, an intermediate surface and an outer surface. The inner surface includes a clamping area and a lead-in area. The intermediate and outer surfaces include a data area and a lead-out area, respectively. The lead-in area has disc information recorded on the basis of an HFM (High-Frequency Modulated) groove as in the BD-RW. The data area and the lead-out area have data in pre-pit strings as in a conventional CD-ROM (Compact Disc-Read Only Memory) or DVD-ROM (Digital Versatile Disc-Read Only Memory).

If the lead-in area of the BD-ROM has the disc information recorded in the HFM groove as in the BD-RW, a tracking servo based on a push/pull method for the HFM groove is required. Simultaneously, another tracking servo based on a DPD (Differential Phase Detection) method for the pre-pit strings recorded on the data area and the lead-out area is also required.

Where only the HFM groove is formed on the lead-in area and the pre-pit data is not recorded on the lead-in area, there is a problem in that concatenated playback of the lead-in area and the data area is cut off because a PLL (Phase Locked Loop) circuit using an RF (Radio Frequency) does not operate.

FIG. 5 is a view illustrating the configuration of a tracking servo based on a DPD (Differential Phase Detection) method, which is applied to a conventional optical disc apparatus.

As shown in FIG. 5, the optical disc apparatus includes a 4-element PD (photodiode) 22 for converting light received through an OL (Objective Lens) 20 and a CL (Collimating Lens) 21 into electric signals Ea, Eb, Ec and Ed; phase detectors (PHs) 26, 27, 28 and 29 for detecting phases of the electric signals Eb, Ed, Ec and Ea; summing amplifiers 23 and 24 for summing the electric signals Eb and Ed outputted from the phase detectors 26 and 27 and the electric signals Ec and Ea outputted from the phase detectors 28 and 29 to generate summed electric signals Eb+Ed and Ec+Ea; and a differential amplifier 25 for carrying out a differential amplification for the summed electric signals Eb+Ed and Ea+Ec outputted by the summing amplifiers 23 and 24 and then outputting a tracking error signal TE=((Ea+Ec)−(Eb+Ed)).

Further, different tracking servo operations, i.e., a tracking servo operation based on a push/pull method and another tracking servo operation based on the DPD method, must be carried out for the same BD-ROM inserted into the optical disc apparatus. As a result, because the conventional optical disc apparatus requires a complex algorithm to control the different tracking servo operations, there is another problem in that a size of the conventional optical disc apparatus increases to accommodate these two tracking servo systems.

SUMMARY OF THE INVENTION

It is an object of the present invention to provide an apparatus and method capable of recording data on a lead-in area of a high-density read-only optical disc such as, a BD-ROM (Blu-ray disc ROM (Read Only Memory)) in the form of pre-pit strings associated with an HFM (High-Frequency Modulated) groove, and continuously applying the same tracking servo operation to an entire area of the high-density read-only optical disc or a high-density rewritable optical disc.

In accordance with one aspect of the present invention, the above and other objects can be accomplished by the provision of a high-density read-only optical disc including a lead-in area, a data area and a lead-out area, on which data of pre-pit strings are recorded, wherein the lead-in area has the pre-pit strings continuously formed on a same track line in a predetermined recording section or has the pre-pit strings discontinuously formed on different positions within a same track line in a predetermined recording section.

In accordance with another aspect of the present invention, there is provided a high-density optical disc apparatus, comprising: photoelectric conversion means for receiving light reflected from an optical disc and outputting a plurality of electric signals; first detection means for carrying out a summing operation and a differential amplification for the outputted electric signals and detecting a tracking error signal based on a push/pull method; second detection means for detecting the outputted electric signals, carrying out a summing operation and a differential operation for electric signals having different phases, and detecting a tracking error signal based on a DPD (Differential Phase Detection) method; and output means for selectively outputting one of the tracking error signals based on the push/pull method and the DPD method detected by the first and second detection means according to a type of the optical disc.

In accordance with yet another aspect of the present invention, there is provided a method for reproducing data from an optical disc, comprising the steps of: (a) converting light reflected from the optical disc into a plurality of electric signals; (b) carrying out a summing operation and a differential amplification for the outputted electric signals and detecting a tracking error signal based on a push/pull method and a tracking error signal based on a DPD (Differential Phase Detection) method; and (c) selecting one of the tracking error signals based on the push/pull method and the DPD method detected by the first and second detection means according to a type of the optical disc and carrying out a tracking servo operation corresponding to the selected tracking error signal.

In accordance with an aspect of the present invention, the above and other objects can be accomplished by the provision of a high-density read-only optical disc including a lead-in area, a data area and a lead-out area, having: a specific area contained in the lead-in area on which pit strings having a recording pattern of an HFM (High-Frequency Modulated) groove, based on a bi-phase modulation, are formed, wherein the specific area has 2n+1 (odd) number of spaces and marks or marks and spaces repeatedly formed in a same-level recording section of the HFM groove based on the bi-phase modulation.

In accordance with another aspect of the present invention, the above and other objects can be accomplished by the provision of a high-density read-only optical disc including a lead-in area, a data area and a lead-out area, having: a specific area contained in the lead-in area on which a pit string of a mark and space or a space and mark having a recording pattern of an HFM (High-Frequency Modulated) groove based on a bi-phase modulation, is formed, wherein the HFM groove based on the bi-phase modulation has a level transition point formed on the basis of a center of a space.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of a high-density read-only optical disc, and an optical disc apparatus and method using the same in accordance with the present invention will be described in detail with reference to annexed drawings.

Figure 6:
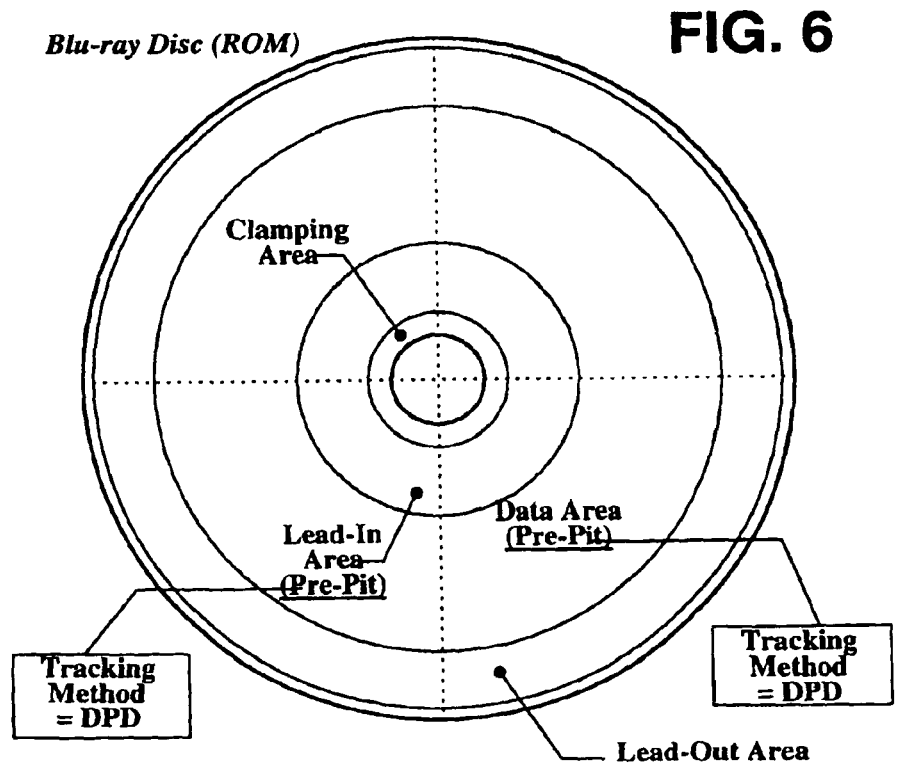
FIG. 6 is a view illustrating the structure of a BD-ROM (Blu-ray disc ROM (Read Only Memory)) in accordance with an embodiment of the present invention.

FIG. 6 is a view illustrating the structure of a BD-ROM (Blu-ray disc ROM (Read Only Memory)) of a high-density read-only optical disc in accordance with an embodiment of the present invention.

Figure 1:
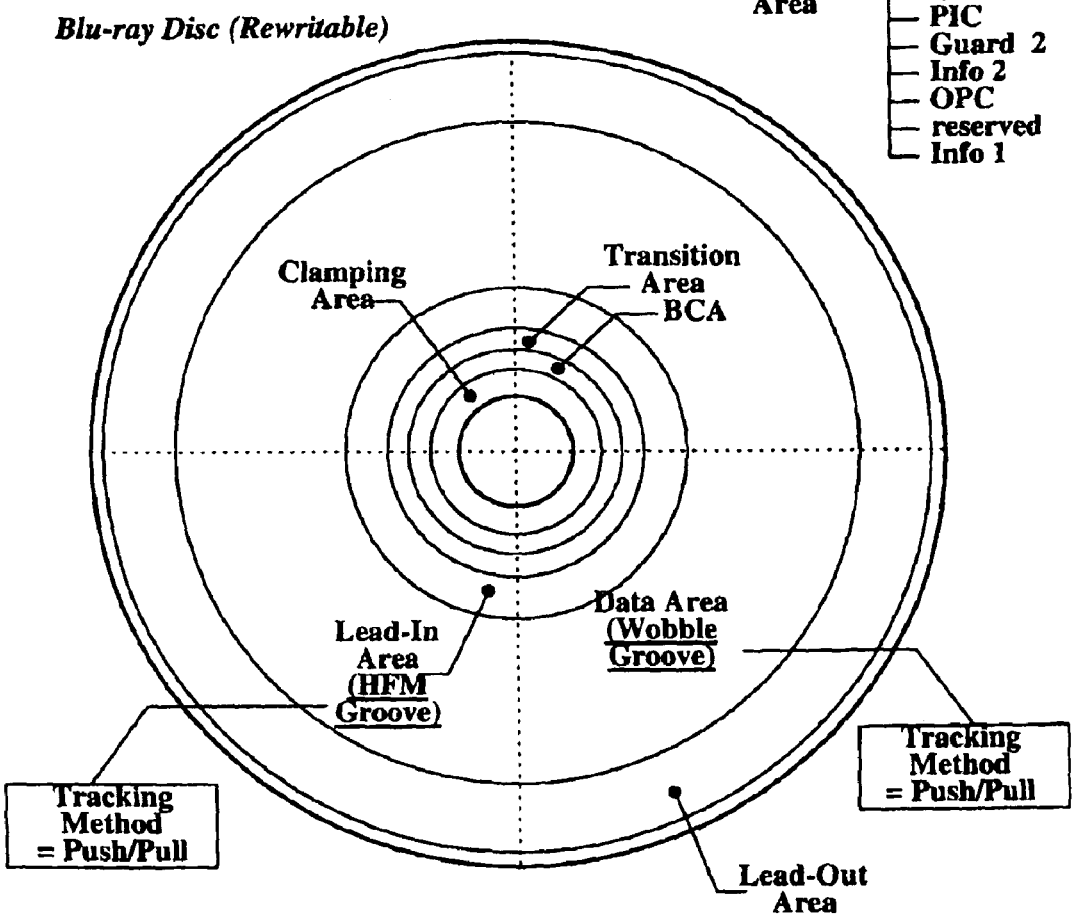
FIG. 1 is a view illustrating the structure of a conventional BD-RW (Blu-ray Disc Rewritable)
Figure 2:
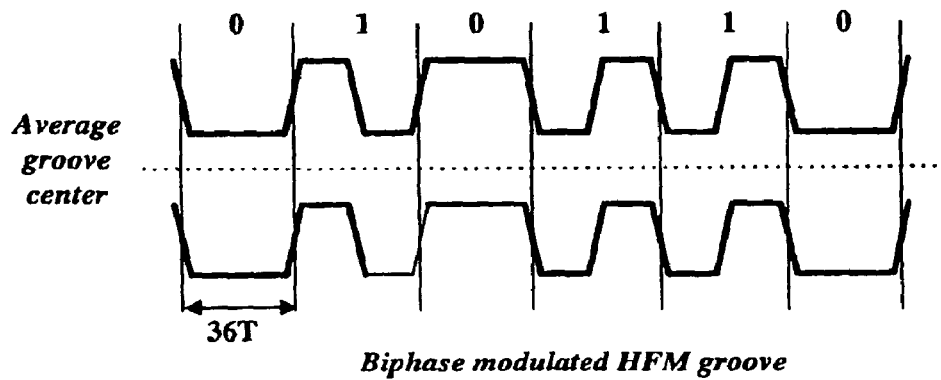
FIG. 2 is a view illustrating the shape of an HFM (High-Frequency Modulated) groove formed on a lead-in area of the conventional BD-RW.
Figure 3:
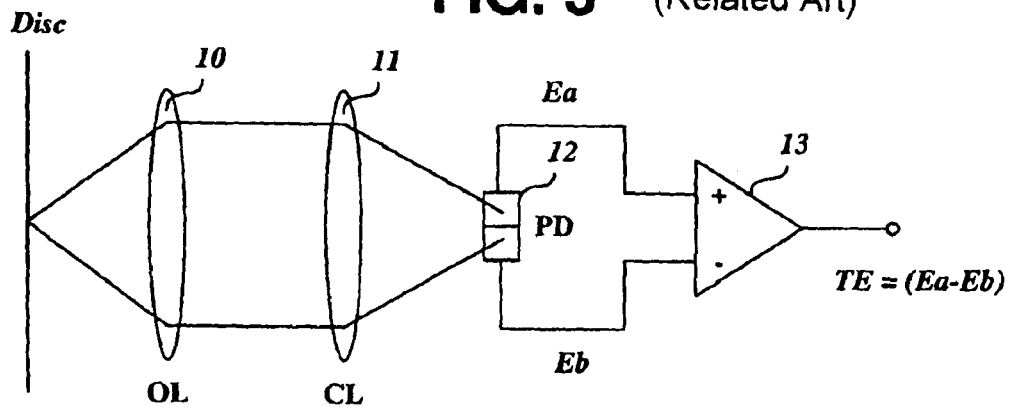
FIG. 3 is a view illustrating the configuration of a tracking servo based on a push/pull method, which is applied to an optical disc apparatus for the conventional BD-RW.
Figure 4:
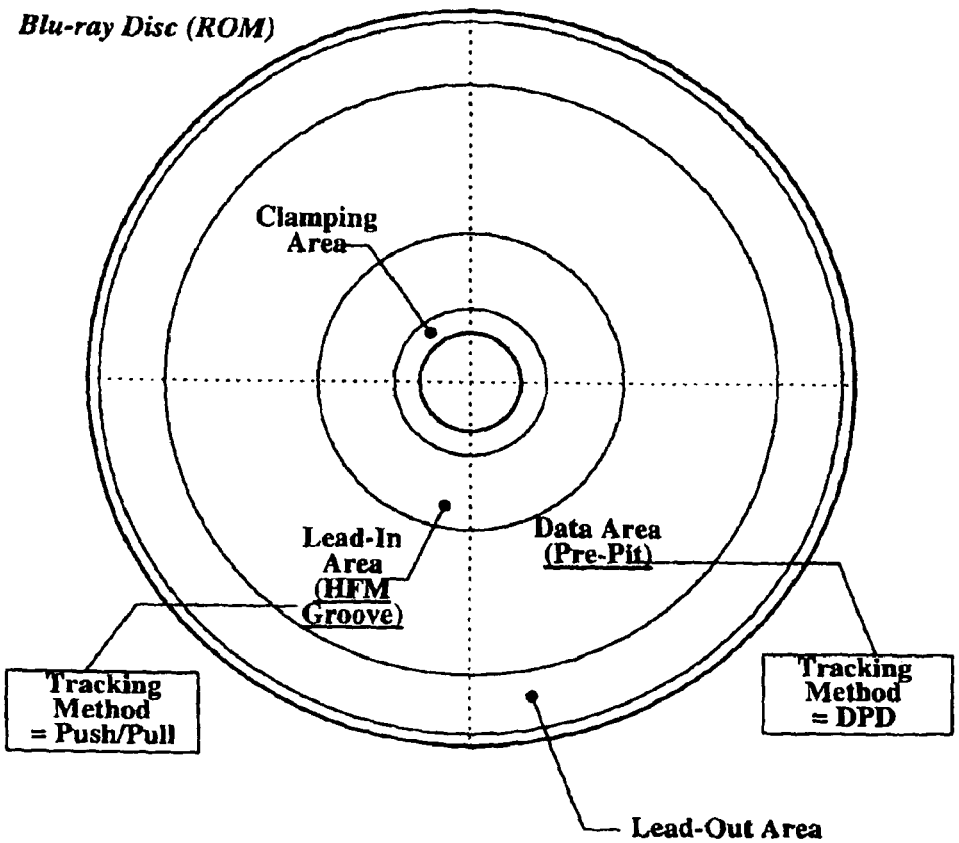
FIG. 4 is a view illustrating the structure of a conventional BD-ROM (Blu-ray disc ROM (Read Only Memory))
Figure 5:
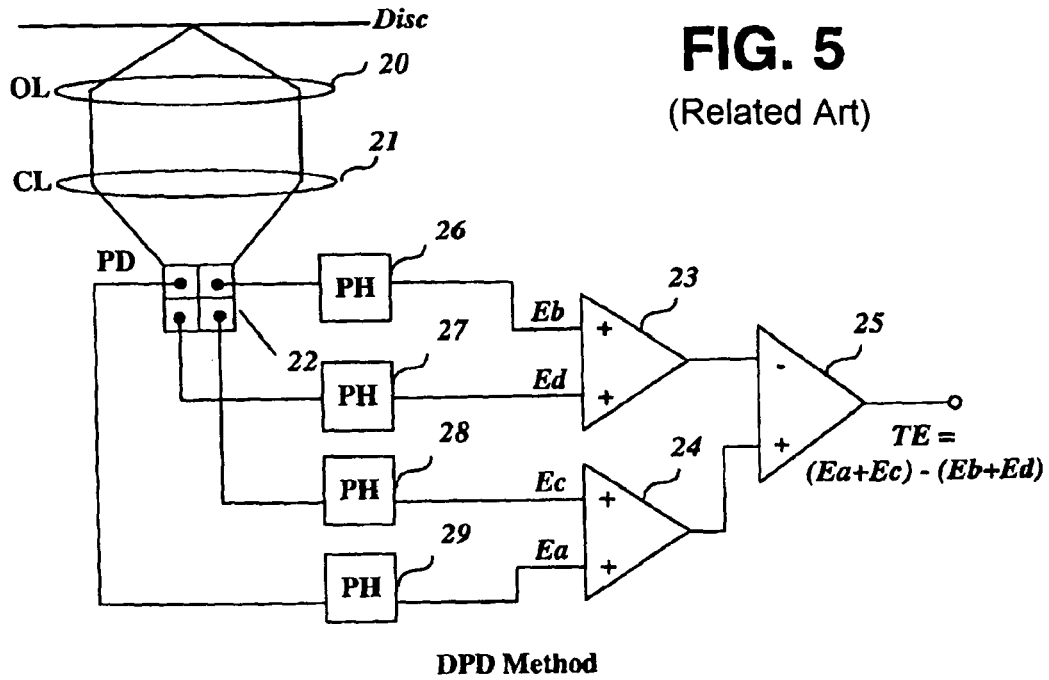
FIG. 5 is a view illustrating the configuration of a tracking servo based on a DPD (Differential Phase Detection) method, which is applied to a conventional optical disc apparatus.

FIG. 6 illustrates a structure of the BD-ROM having an inner surface, an intermediate surface and an outer surface, that is similar to that described above in conjunction with FIG. 4. The inner surface includes a clamping area and a lead-in area. The intermediate and outer surfaces include a data area and a lead-out area, respectively. The data area and the lead-out area have data recorded in pre-pit strings as in a conventional CD-ROM (Compact Disc-Read Only Memory) or DVD-ROM (Digital Versatile Disc-Read Only Memory).

However, unlike conventional read-only optical discs, data in the form of pre-pit strings are recorded and stored on the lead-in area in a manner similar to the HFM groove having pre-recorded data formed in the PIC sub-area of the lead-in area contained on the BD-RW. In other words, the data, in the form of the pre-pit strings, are recorded on the lead-in area of the BD-ROM in a manner similar to how data is recorded in pre-pit areas on the data area and the lead-out area of the BD-ROM.

An optical disc apparatus for reproducing the data of the pre-pit strings enables a tracking servo operation based on the DPD (Differential Phase Detection) method to be consistently applied to an entire area of the same BD-ROM when inserted into the apparatus. Or more simply, the same servo tracking method may be used in each of the lead-in, data and lead-out areas.

Figure 7:
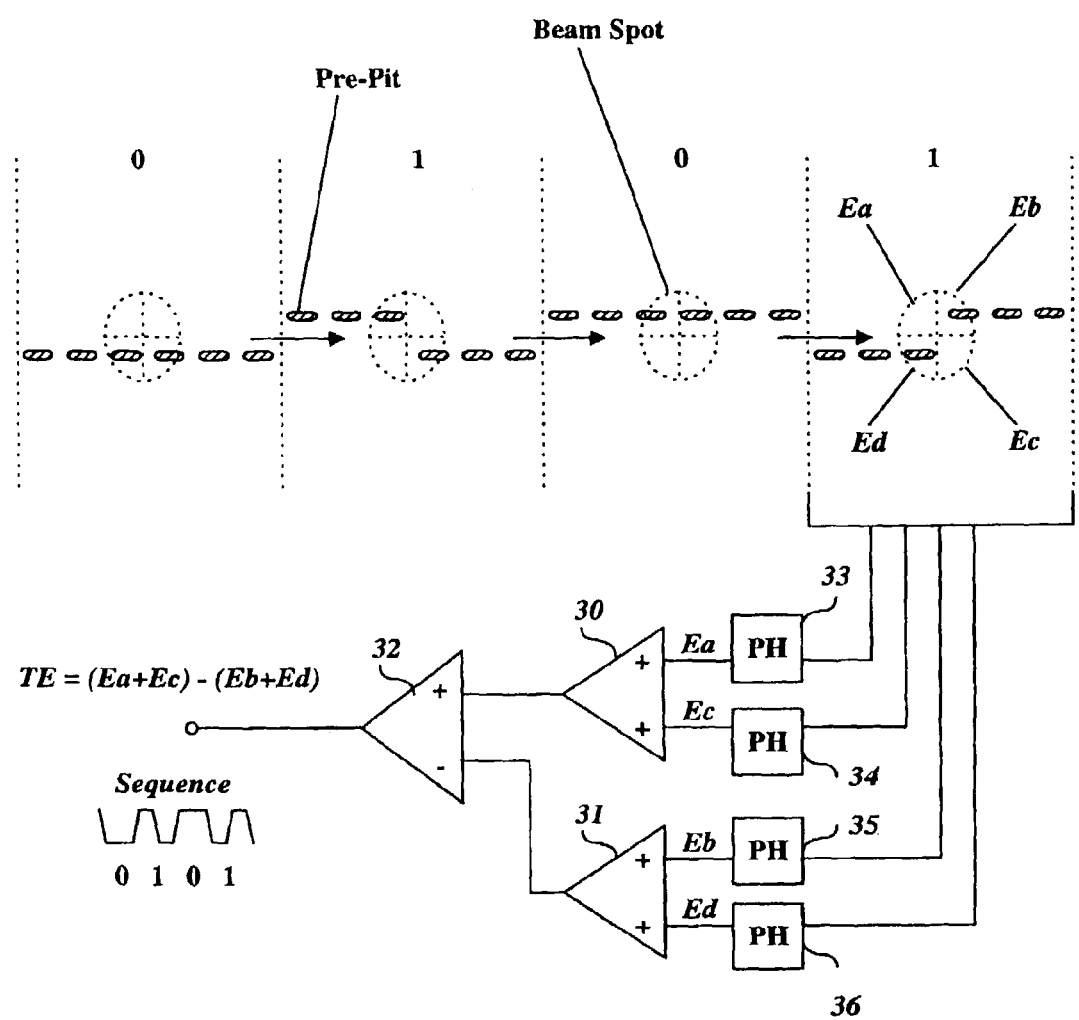
FIG. 7 is a view illustrating the shape of pre-pit strings formed on a lead-in area of the BD-ROM in accordance with the present invention.

FIG. 7 is a view illustrating the shape of pre-pit strings formed on the lead-in area of the BD-ROM in accordance with the present invention. As shown there, in a pattern of the pre-pit strings formed on the lead-in area, the pre-pit strings can be continuously formed on the same track line in a predetermined recording section. Alternatively, the pre-pit strings can be discontinuously formed on different positions within the same track.

For example, a data sequence having a value of "0101" is recorded on the lead-in area. The length of each bit cell is 36 T, where T corresponds to the length of a Channel bit. A recording section of 36 T has a data value of "0" when six 3 T pre-pits are formed on the same track line, whereas another recording section of 36 T has a data value of "1" when two strings are formed on different positions within the same track, wherein each of the two strings has three 3 T pre-pits. As the pre-pit strings are formed as described above, disc information can be recorded by forming the pre-pit strings as described above, similarly to the HFM groove.

Light reflected from the pre-pit strings, continuously and discontinuously formed on the lead-in area, is converted into electric signals by a 4-element photodiode (not shown), which is applied to a tracking servo based on a conventional DPD method. At this time, the electric signals Ea, Eb, Ec and Ed are applied to a plurality of phase detectors (PHs) 33, 34, 35 and 36, first and second summing amplifiers 30 and 31 and a differential amplifier 32. A tracking error signal TE=((Ea+Ec)−(Eb+Ed)) is then produced based on the DPD method. The tracking error signal is thereafter outputted from the differential amplifier 32.

Thus, a tracking servo operation based on the DPD method for the pre-pit strings can be applied to the lead-in area. The recorded data sequence of "0101" is detected and decoded by filtering a DPD signal in accordance with a corresponding frequency. The optical disc apparatus continuously carries out a tracking servo operation based on the DPD method, such that the optical disc apparatus can appropriately apply the tracking servo operation to an entire area of the BD-ROM. As a result, disc information can be recorded using the pre-pit strings (as in the HFM groove), and the same PLL (Phase Locked Loop) circuit operation can be carried out from the lead-in area to other areas.

Lengths of respective pits formed on the lead-in area can be the same as each other. Alternatively, for example, two or three types of the lengths of respective pits can be formed on the lead-in area.

Unique patterns or shapes of the pit strings may represent, different values of information. Adjusting the depth of a pit to be shallower or deeper than the depth of "λ4" may be used for detecting a small push/pull signal. For example, the depth of a pit has a value of "3λ4" in the case of the BD-ROM, and the depths of pits of the lead-in area and the data area have different values of "λ8" and "λ4" in the case of the BD-RW, respectively.

The pre-pit strings use a modulation code in the data area. The modulation code is based on a length selected from the group consisting of 2 T, 3 T or others. A plurality of different data can be additionally recorded on pits.

Figure 8:
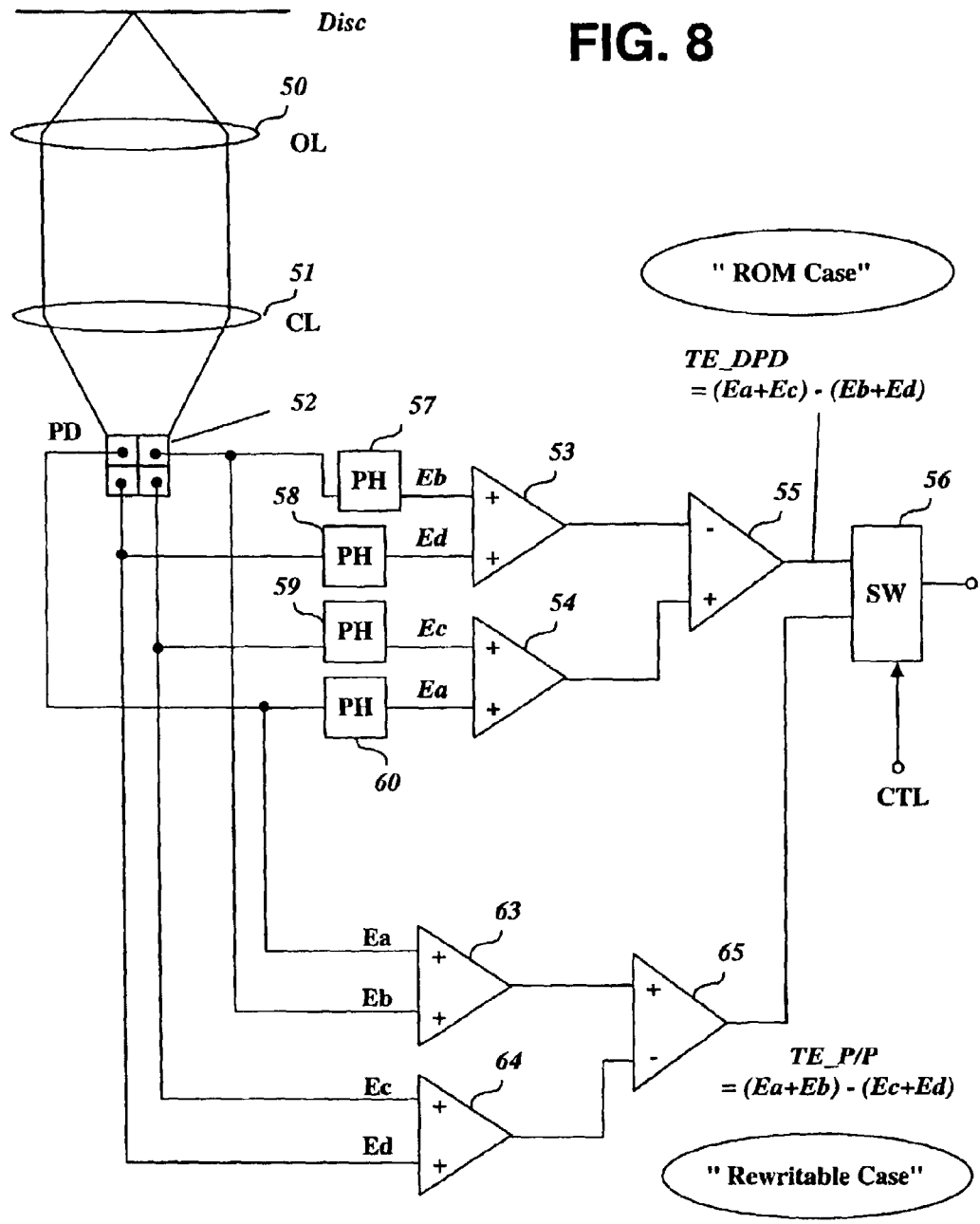
FIG. 8 is a view illustrating the configuration of a tracking servo based on a push/pull method and a DPD (Differential Phase Detection) method, which is applied to an optical disc apparatus and method using an optical disc.

In a different embodiment, FIG. 8 is a view illustrating the configuration of a tracking servo based on a push/pull method and a DPD (Differential Phase Detection) method, which is applied to an optical disc apparatus and method using an optical disc. The optical disc apparatus in accordance with the present invention enables a tracking servo operation corresponding to the optical disc to be selectively carried out where a BD-RW or a BD-ROM is inserted into the apparatus.

For this, the optical disc apparatus includes an OL (Objective Lens) 50, a CL (Collimating Lens) 51, a 4-element PD (photodiode) 52, a plurality of summing amplifiers 53, 54, 63 and 64, differential amplifiers 55 and 65, and a selection switch 56. The functionalities of components included in the optical disc apparatus will be described in detail.

First, where a BD-RW or BD-ROM is inserted into the optical disc apparatus, light reflected through the OL 50 and the CL 51 is converted into electric signals Ea, Eb, Ec and Ed.

In the case of a ROM, the electric signals Ea, Eb, Ec and Ed are applied to the first and second summing amplifiers 53 and 54 and the first differential amplifier 55. As a result, a tracking error signal TE_DPD=(Ea+Ec)−(Eb+Ed)) based on the DPD method is detected and outputted.

In the case of a BD-RW (or rewritable case), the electric signals Ea, Eb, Ec and Ed outputted by the 4-element PD 52 are applied to the third and fourth summing amplifiers 63 and 64 and the second differential amplifier 65. As a result, a tracking error signal TE_P/P=((Ea+Eb)−(Ec+Ed)) based on the push/pull method is detected and outputted.

Where an optical disc inserted into the apparatus is a BD-ROM, a microcomputer (not shown) and a servo controller (not shown), provided in the optical disc apparatus, control an operation of a selection switch 56 such that the tracking error signal TE_DPD based on the DPD method detected and outputted by the first differential amplifier 55 can be selectively outputted. Otherwise, where an optical disc inserted into the apparatus is a BD-RW, the microcomputer and the servo controller, provided in the optical disc apparatus, control an operation of the selection switch 56 such that the tracking error signal TE_P/P based on the push/pull method detected and outputted by the second differential amplifier 65 can be selectively outputted.

In other words, the tracking servo operation based on the push/pull method is selectively carried out in the case of a BD-RW, whereas the tracking servo operation based on the DPD method is selectively carried out in the case of a BD-ROM.

Where an optical disc apparatus for the BD-ROM is developed and supplied, only the tracking servo operation based on the DPD method as described above can be employed.

Another aspect of the invention will be described in detail with reference to FIGS. 9 to 11.

A push/pull signal must be continuously detected at wobbled spaces and marks or at spaces and marks repeatedly formed on the PIC sub-area without cutoff such that major information of the optical disc permanently recorded on the PIC sub-area contained in a lead-in area of the BD-ROM can be correctly decoded.

First, the PIC sub-area of the BD-ROM in accordance with the present invention can include pit strings having a recording pattern of a HFM (High-Frequency Modulated) groove based on a bi-phase modulation, wherein the major information is recorded in the form of the pit strings.

Moreover, if a HFM groove of in-phase patterns is formed in a recording section of 36 T, a data value of "0" is recorded. Otherwise, if a HFM groove of anti-phase patterns is formed in the recording section of 36 T, a data value of "1" is recorded. At this time, 2n+1 (odd) number of spaces and marks or marks and spaces are repeatedly formed in the same level section.

Figure 9:
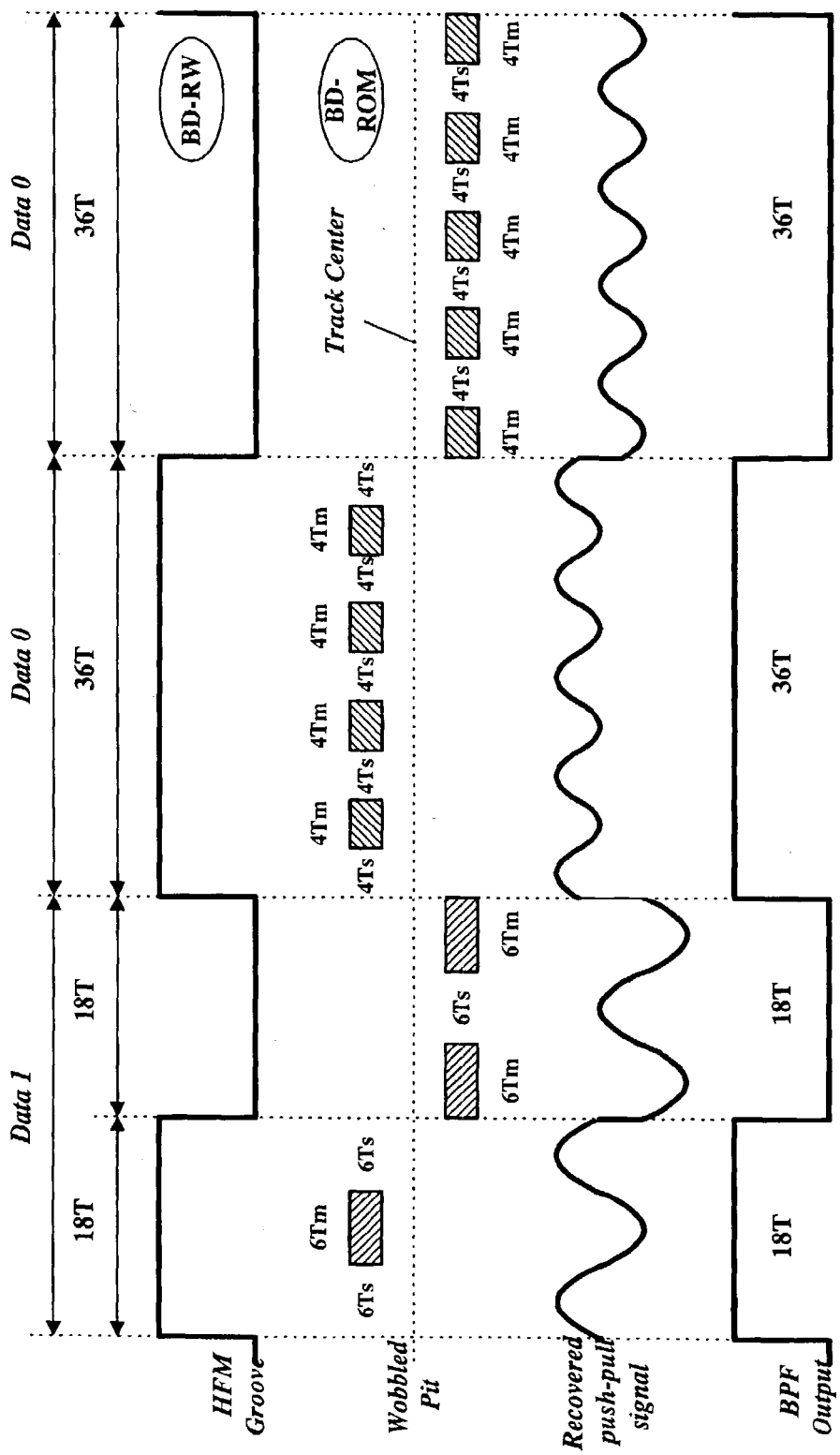
FIGS. 9 to 11 are views illustrating wobbled spaces and marks formed on a PIC (Permanent Information and Control data) sub-area of the BD-ROM in accordance with an embodiment of the present invention.

For example, as shown in FIG. 9, a space 6 Ts, a mark 6 Tm and a space 6 Ts each having a length 6 T are sequentially and repeatedly formed in 18 T recording sections of a high recording level corresponding to the data value of "1". Further, a mark 6 Tm, a space 6 Ts and a mark 6 Tm, each having a length 6 T, are sequentially and repeatedly formed in 18 T recording sections of a low recording level corresponding to the data value of "1".

That is, the "space, mark, space" or "mark, space, mark" combinations have a predetermined length that are sequentially and repeatedly formed in the 18 T recording sections. At this time, the sum of space(s) and mark(s) repeatedly formed in the recording section of the low or high recording level is three, i.e., an odd number. Moreover, the spaces or marks are formed at start and end parts of a corresponding recording section.

In contrast, a space 4 Ts and a mark 4 Tm each having a length 4 T are sequentially and repeatedly formed in each of 36 T recording sections of the high recording level corresponding to the data value of "0". Further, a mark 4 Tm and a space 4 Ts each having a length 4 T are sequentially and repeatedly formed in each of 36 T recording sections of the low recording level corresponding to the data value of "0".

That is, the "space and mark" or the "mark and space" combinations have a predetermined length that are sequentially and repeatedly formed in each of the 36 T recording sections. At this time, the sum of the spaces and marks repeatedly formed in the recording section of the low or high recording level is nine, i.e., an odd number. Moreover, the spaces or marks are formed at start and end parts of a corresponding recording section.

A space and mark are respectively formed at the left and right of a low-level transition point of the HFM groove based on the bi-phase modulation. A mark and space are respectively formed at the left and right of a high-level transition point of the HFM groove based on the bi-phase modulation, respectively.

For example, as shown in FIG. 9, a space 6 Ts, and a mark 6 Tm each having a length 6 T, are formed at the left and right of a level transition point Tr1 directed to an 18 T recording section of the low recording level from an 18 T recording section of the high recording level corresponding to the data value of "1", respectively. A mark 6 Tm of a length 6 T and a space 4 Ts of a length 4 T are respectively formed at the left and right of a level transition point Tr2 directed to a 36 T recording section of the high recording level from an 18 T recording section of the low recording level corresponding to the data value of "1".

A space 4 Ts of a length 4 T and a mark 4 Tm of a length 4 T are respectively formed at the left and right of a level transition point Tr3 directed to a 36 T recording section of the low recording level from a 36 T recording section of the high recording level. Accordingly, the cutoff of the push/pull signal detected at the level transition point is minimized.

Figure 10:
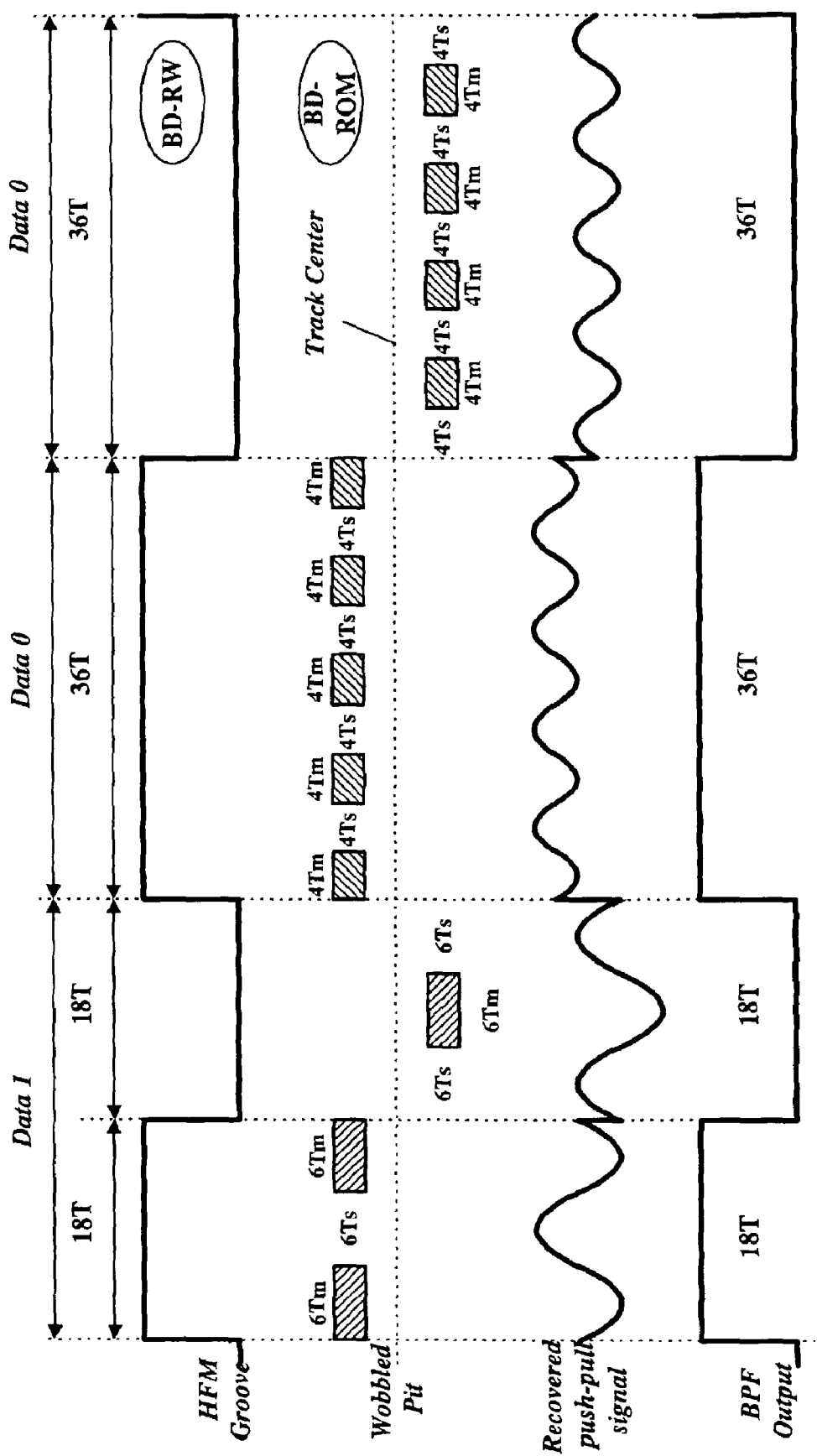

As shown in FIG. 10, a mark 6 Tm and a space 6 Ts each having a length 6 T are respectively formed at the left and right of a level transition point Tr4 directed to an 18 T recording section of the low recording level from an 18 T recording section of the high recording level corresponding to the data value of "1". Further, a space 6 Ts of a length 6 T and a mark 4 Ts of a length 4 T are respectively formed at the left and right of a level transition point Tr5 directed to a 36 T recording section of the high recording level from an 18 T recording section of the low recording level corresponding to the data value of "1". At this time, the push/pull signal detected at the level transition point can be cut off and hence a decoding operation cannot be correctly carried out.

It is an advantage that a frequency of the push/pull signal is far away from a frequency of general data signal such that the push/pull signal detected from the wobbled space and mark can be classified and detected more correctly than an RF (Radio Frequency) signal detected from general pre-pit data. Thus, it is preferable that the pit length of a space or mark is short, if possible. For example, the pit length of a space or mark can be 2 T, 3 T or others.

Moreover, it is preferable that the pit length of the space or mark formed in the same level section of the HFM groove based on the bi-phase modulation is set for an appropriate tracking servo operation such that a DSV (Digital Sum Value) becomes zero or a minimum value.

Figure 11:
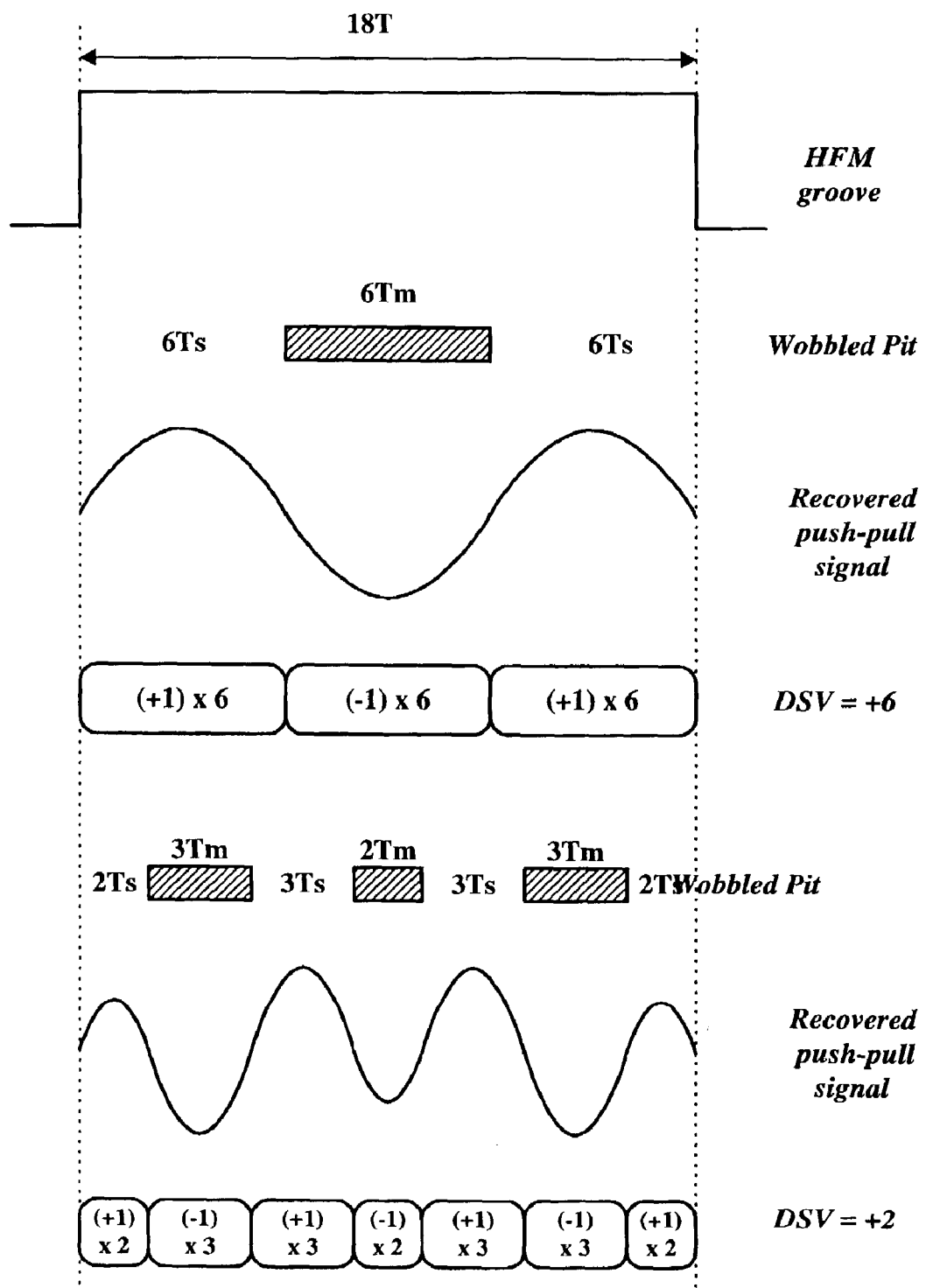

For example, as shown in FIG. 11, where a space 6 Ts, a mark 6 Tm, and a space 6 Ts, each having a length 6 T, are sequentially formed in the 18 T recording section of the high recording level corresponding to the data value of "1", the DSV calculated by a conventional equation becomes "+6". However as illustrated in the lower portion of FIG. 11, where a combination of a space 2 Ts or 3 Ts of the length 2 T or 3 T and a mark 2 Tm or 3 Tm of the length 2 T or 3 T is formed in the 18 T recording section, the DSV becomes "+2". Under these conditions, the tracking servo operation can be more appropriately performed.

It is preferable that a space or mark, having a relatively longer pit length among the spaces and marks of the lengths where the DSV becomes zero or a minimum value, is formed at an end part of the same level section.

For example, ten spaces 3 Ts or marks 3 Tm, and, three spaces 2 Ts or marks 2 Tm, can be formed in the "36 T" recording section of the high recording level corresponding to the data value of "0". Where spaces and marks are formed in the order of 2 Ts, 3 Tm, 3 Ts, 3 Tm, 3 Ts, 3 Tm, 2 Ts, 3 Tm, 3 Ts, 3 Tm, 3 Ts, 3 Tm and 2 Ts as a first embodiment or formed in the order of 3 Ts, 3 Tm, 2 Ts, 3 Tm, 3 Ts, 3 Tm, 2 Ts, 3 Tm, 3 Ts, 3 Tm, 2 Ts, 3 Tm and 3 Ts as a second embodiment, both DSVs in the first and second embodiments become zero. However, the space having the relatively longer length, i.e., the space 3 Ts of a length 3 T, is formed at the end part of the recording section as in the second embodiment such that the push/pull signal can be detected more correctly at the level transition point.

For reference, where six spaces 3 Ts or marks 3 Tm having a length 3 T and nine spaces 2 Ts or marks 2 Tm having a length 2 T are formed in the "36 T" recording section, it is preferable that the spaces and marks or the marks and spaces are formed in the order of 2 Ts, 2 Tm, 2 Ts, 3 Tm, 3 Ts, 3 Tm, 2 Ts, 2 Tm, 2 Ts, 3 Tm, 3 Ts, 3 Tm, 2 Ts, 2 Tm and 2 Ts.

Moreover, where four spaces 3 TS or marks 3 Tm having the length 3 T and three spaces 2 Ts or marks 2 Tm having the length 2 T are formed in the "18 T" recording section, it is preferable that the spaces and marks or the marks and spaces are formed in the order of 2 Ts, 3 Tm, 3 Ts, 2 Tm, 3 Ts, 3 Tm and 2 Ts.

The level transition point can be set such that a level transition is accomplished on the basis of a center of a space. At this time, the sum of marks and spaces or the sum of spaces and marks is kept as an odd number.

With reference to FIGS. 12-15, a push/pull signal must be continuously detected at wobbled spaces and marks or at spaces and marks repeatedly formed on the PIC sub-area without cutoff such that major information of the optical disc permanently recorded on the PIC sub-area contained in a lead-in area of the BD-ROM can be correctly decoded. This will be described in detail.

As discussed previously, a BD-ROM (Blu-ray Disc ROM (Read Only Memory)) includes a PIC (Permanent Information and Control data) sub-area on which pit strings having a recording pattern of an HFM (High-Frequency Modulated) groove based on a bi-phase modulation are formed. The PIC subarea has information recorded in the form of pit strings. A level transition or level transition point of the HFM groove based on the bi-phase modulation is made on the basis of a center of a space.

If the HFM groove is formed of in-phase patterns in a recording section of 36 T, a data value of "0" is recorded on the HIM groove. Otherwise, if the HFM groove is formed of anti-phase patterns in the recording section of 36 T, a data value of "1" is recorded on the HFM groove.

Figure 12:
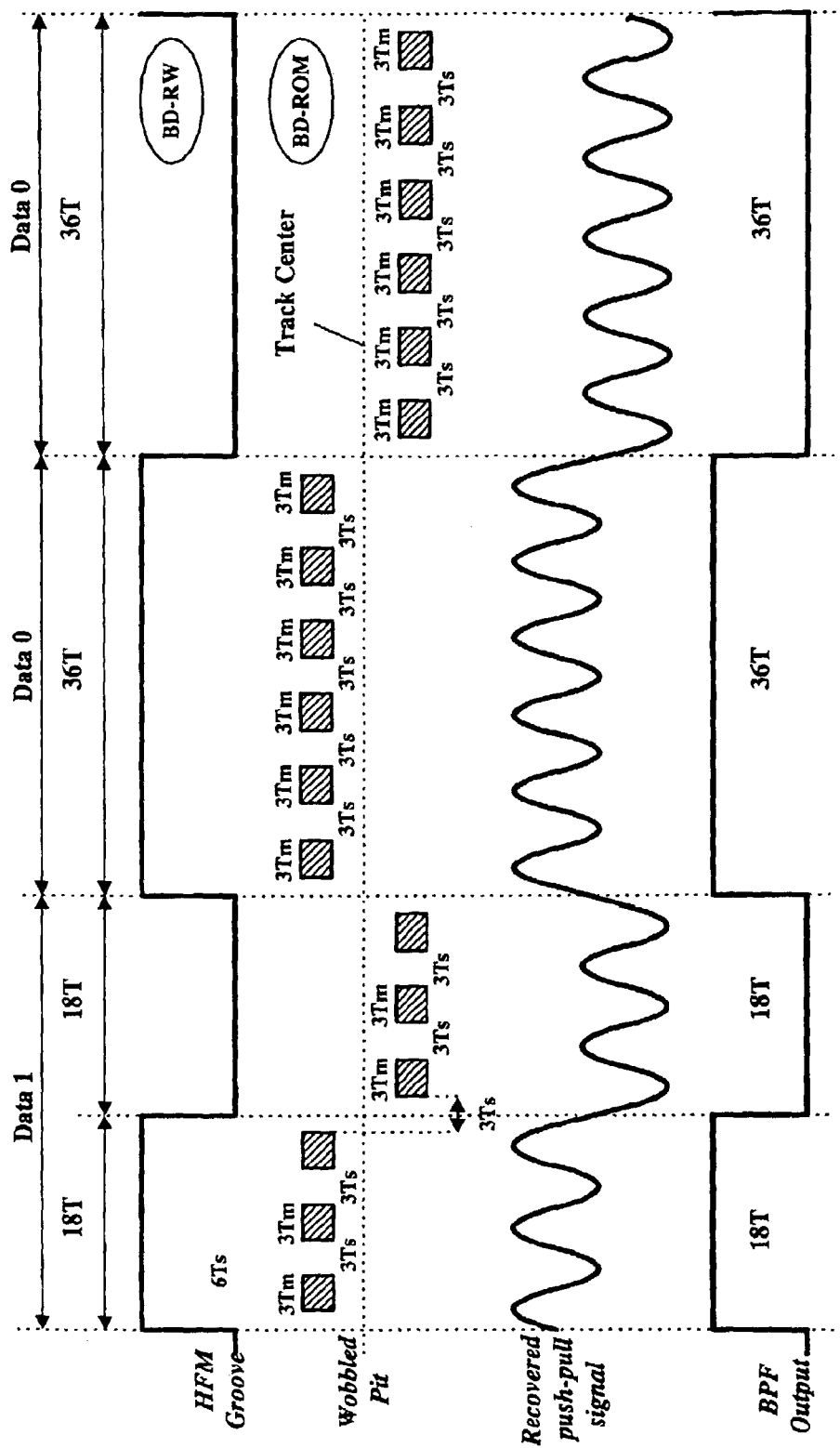
FIGS. 12 to 15 are views illustrating wobbled spaces and marks formed on a PIC (Permanent Information and Control data) sub-area of the BD-ROM in accordance with an embodiment of the present invention.

For example, as shown in FIG. 12, a level transition or level transition point of the HFM groove based on bi-phase modulation is made on the basis of a center of a space. A mark 3 Tm and a space 3 Ts having a length 3 T are repeatedly formed in a recording section of 18 T having a high recording level corresponding to the data value of "1". Further, the mark 3 Tm and the space 3 Ts having a length 3 T are repeatedly formed in the recording section of 18 T having a low recording level corresponding to the data value of "1".

Similarly, the mark 3 Tm and the space 3 Ts having a length 3 T are repeatedly formed in the recording section of 36 T having a high recording level corresponding to the data value of "0". Further, the mark 3 Tm and the space 3 Ts having the length 3 T are repeatedly formed in the recording section of 36 T having a low recording level corresponding to the data value of "0".

Figure 13:
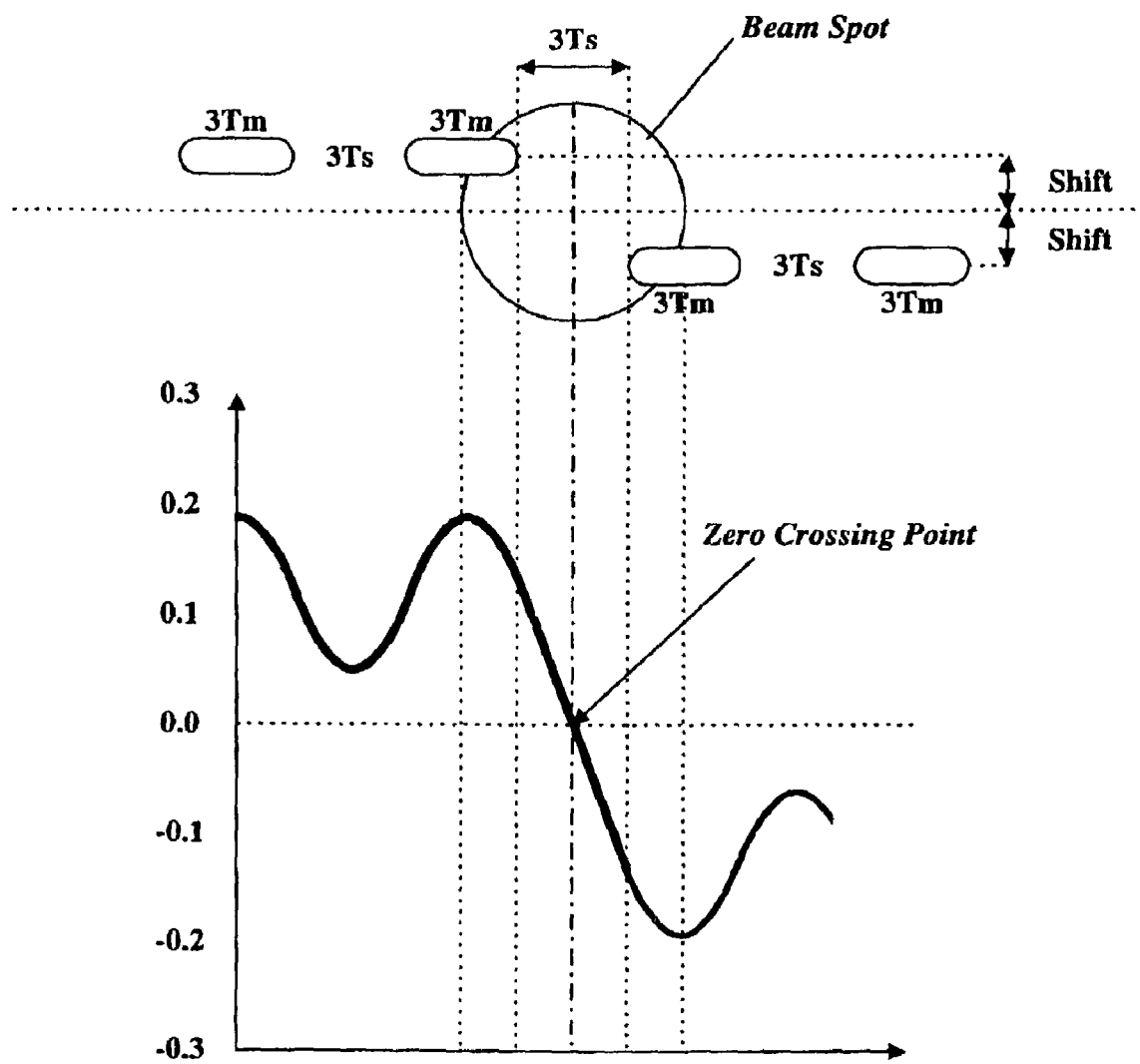

As shown in FIG. 13, since a level transition or a level transition point of the HFM groove based on bi-phase modulation is made on the basis of a center of a space, the level transition point matches the zero crossing point of a push/pull signal. Therefore, a data value can be correctly detected on the basis of the zero crossing point of the push/pull signal.

The space and mark can be formed in a length of at least 2 T or 3 T, respectively. As shown in FIG. 12, the bilaterally symmetrical marks having the same length are formed on the basis of the level transition point. After a level of the push/pull signal is sliced, the data value of a recovered signal can be correctly detected.

Since the level of the push/pull signal corresponding to the mark and space increases, where the lengths of the mark and space are 5 T or more, respectively, an erroneous level transition point can be detected. The length of the mark or space should be limited to the lengths of 2 T, 3 T or 4 T such that the erroneous level transition point is not detected. Lengths of marks and spaces are combined, selected and formed such that the DSV becomes zero or a minimum value to correctly perform a servo control operation.

Figure 14:
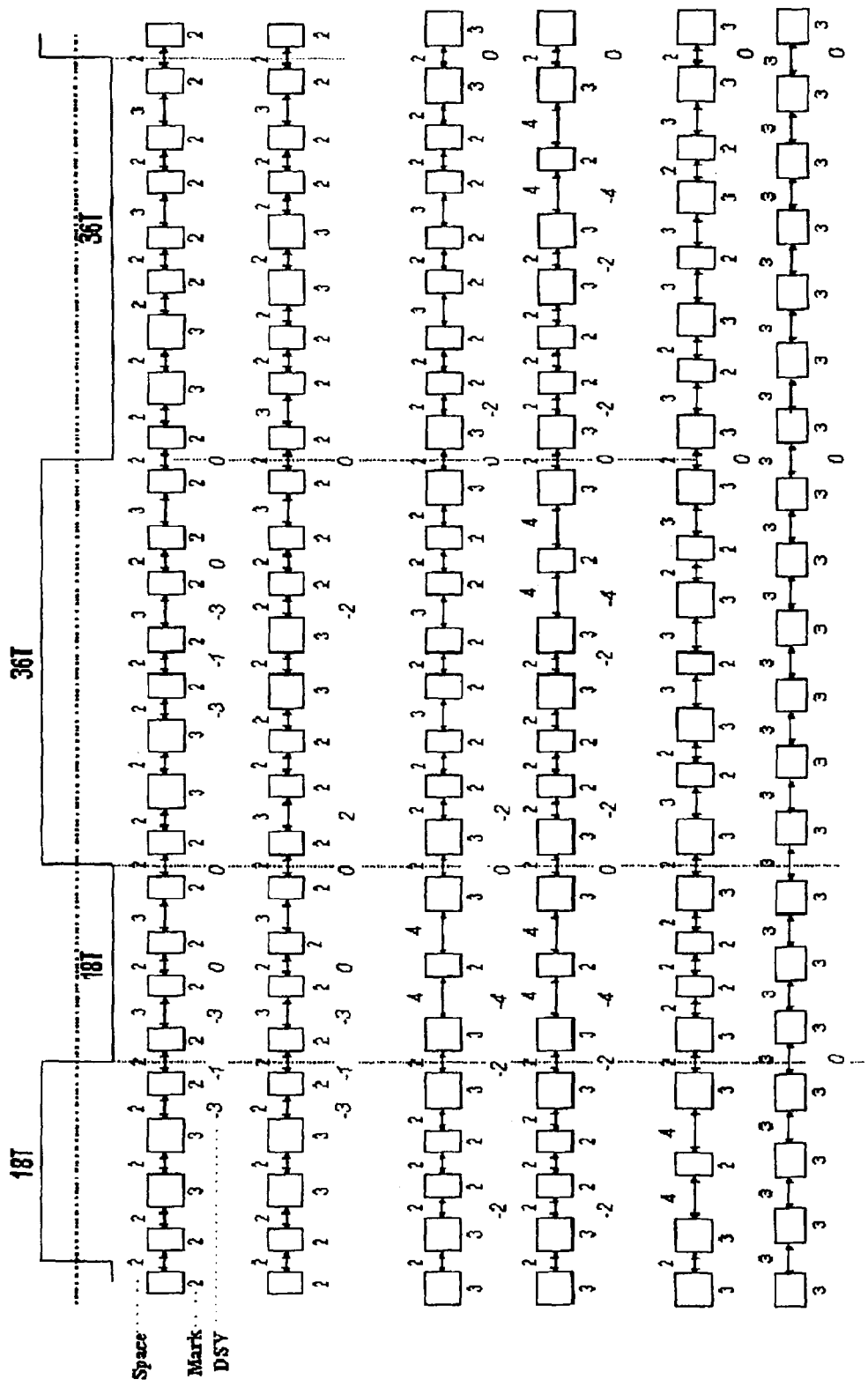

For example, and as shown in FIG. 14, a pit string is formed by a combination of the marks and spaces having the lengths of 2 T, 3 T and 4 T. Simultaneously, the lengths of the marks and spaces are combined and selected such that a DSV associated with the pit string becomes zero or a minimum value.

Marks and spaces having a length of 2 T are not consecutively repeated 7 times or more to meet conditions of a 17-PP (Parity Preserve) modulation code and a prohibit RMTR (Run Limited Transition) associated with a BD-RE (rewritable), which limits the maximum number of repeats of marks and spaces having a length of at least 2 T to "6" such that an RF (Radio Frequency) signal can be appropriately detected.

Furthermore, the shorter the length of a space according to the level transition is, the sharper a level transition waveform of the push/pull signal is. The length of the space is limited to within the length of 4 T, if possible.

Bilaterally symmetrical marks, having the same length, are formed on the basis of the level transition point. The length of the mark is determined according to a diameter of a laser beam spot formed on an optical disc. For example, where a wavelength and NA for a laser beam used in the BD-RE are 400 nm and 0.85, respectively, the diameter of the beam spot formed on the optical disc is approximately 580 nm (=1.22× (400 nm×0.85)), and the diameter of a valid beam spot is approximately 450 nm.

Figure 15:
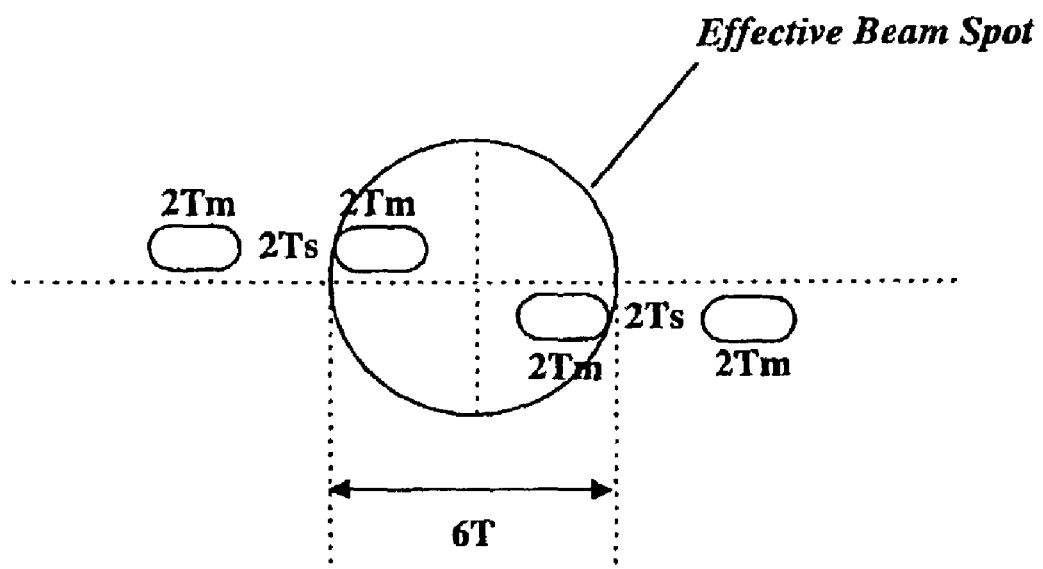
Figure 15:
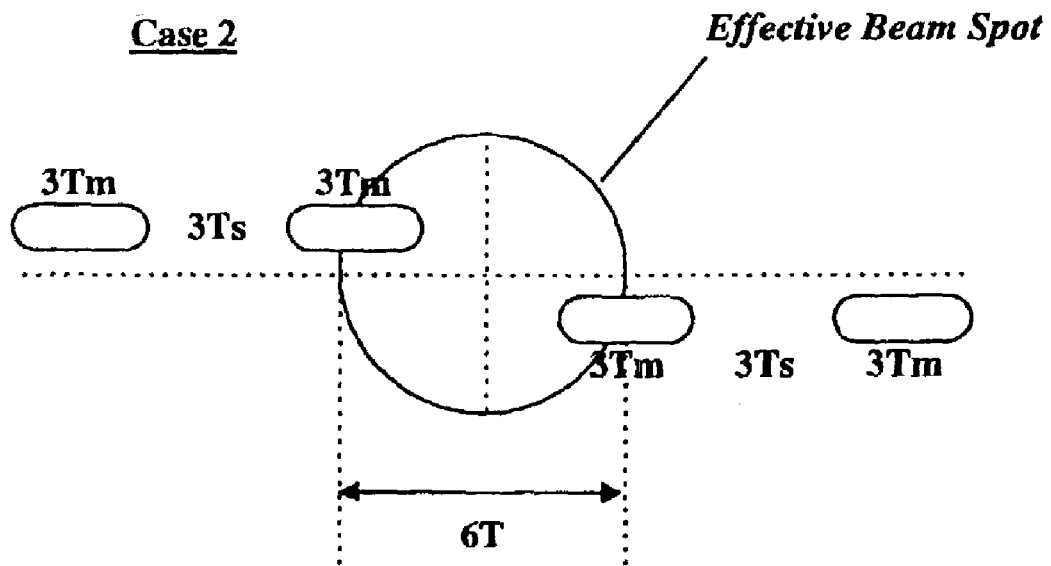

Thus, the length of 1 T corresponds to 80 nm, and 450 nm corresponding to the diameter of the valid beam spot corresponds to approximately 6 T. As shown in FIG. 15, marks bilaterally symmetrical with respect to a space of the level transition are formed such that the sum of lengths of the marks can be 6 T.

The marks bilaterally symmetrical with respect to the space of the level transition can be formed such that the sum of lengths of the marks is more than 6 T. However, where the marks are symmetrical with respect to the space having a length less than the diameter of the valid beam spot or where the marks are symmetrical with respect to the space, an offset of the push/pull signal is generated, thereby increasing an amount of jitter.

As apparent from the above description, the present invention provides a high-density read-only optical disc, and an optical disc apparatus and method using the same, which can simplify an algorithm for controlling a plurality of tracking servo operations, avoid an increased size of the optical disc apparatus, and quickly stabilize a playback reference clock by enabling a PLL (Phase Locked Loop) circuit operation using pre-pits to be carried out from a lead-in area to other areas.

The preferred embodiments of the present invention have been disclosed for illustrative purposes. Those skilled in the art can readily implement the tracking servo based on the push/pull method and the tracking servo based on the DPD method by referring to the embodiments of the present invention. Further, those skilled in the art will appreciate that various modifications, additions and substitutions are possible, without departing from the scope and spirit of the invention as disclosed in the accompanying claims.

What is claimed is:

1. A read-only recording medium, comprising:
a lead-in area, a data area and a lead-out area,
wherein the lead-in area includes straight pits and wobbled pits, the wobbled pits having a specific recording pattern which is modulated by applying phase modulation method in such a manner that a transition is present within predetermined recording section of the lead-in area, the wobbled pits being formed along the transition, while the data area includes straight pits.

2. The recording medium as set forth in claim 1, wherein the specific recording pattern is formed on a sub-area of the lead-in area, the specific recording pattern having control information recorded and stored thereon.

3. The recording medium as set forth in claim 2, wherein the wobbled pits define a plurality of recording sections, each recording section having a length of 36 T, where T corresponds to the length of a channel bit.

4. The recording medium as set forth in claim 3, wherein said each recording section having a length of 36 T includes a mark and space combination of a predetermined length that is sequentially and repeatedly formed in recording sub-sections.

5. The recording medium as set forth in claim 4, wherein at least one of the formed spaces and marks is of a minimum pit length.

6. The recording medium as set forth in claim 2, wherein wobbled pits have a mark before and a space following each transition point from high to low or low to high in the specific recording pattern.

7. The recording medium as set forth in claim 2, wherein wobbled pits have a space before and a mark following each transition point from high to low or low to high in the specific recording pattern.

8. The recording medium as set forth in claim 2, wherein pre-pits having a mark before each transition point from high to low and a space before each transition from low to high in the recording pattern similar to an HFM (High Frequency Modulated) groove based on a bi-phase modulation.

9. A recording medium, comprising:

a lead-in area, a data area and a lead-out area;

the lead-in area having a specific area on which a pit string of a mark and space having a recording pattern which is modulated by a bi-phase modulation, is formed, the pit string being pre-recorded in the form of wobbled pits and straight pits, wherein the data area includes straight pits, wherein the recording pattern has a transition within a predetermined recording section of the specific area and the pit string is formed along the transition.

10. The recording medium as set forth in claim 9, wherein the pit string is formed along the transition in the permanent information & control (PIC) data area of the lead-in zone defined in the Blu-ray Disc which is read-only type.

11. A method for reading a read-only recording medium having a lead-in area, a data area and a lead-out area, comprising:

utilizing wobbled pits having a specific recording pattern which is modulated by applying a phase modulation method in such a manner that a transition is present within a predetermined recording section of the lead-in area, the lead-in area further including straight pits, wherein the wobbled pits are formed along the transition, whereas straight pits are formed in the data area.

12. The method of claim 11, wherein the utilizing step includes the steps of reading control information of the specific recording pattern, the control information being recorded on a sub-area of the lead-in area, determining a reproduction of a data of the data area based on the read control information.

13. The method of claim 12, wherein wobbled pits define a plurality of recording sections, each recording section having a length of 36 T, where T corresponds to the length of a channel bit.

14. An apparatus for reading a read-only recording medium having a lead-in area, a data area and a lead-out area, comprising:

an optical pickup configured to read straight pits and wobbled pits included in the lead-in area, the wobbled pits having a specific recording pattern which is modulated by applying a phase modulation method in such a manner that a transition is present within a predetermined recording section of the lead-in area, said wobbled pits being formed along the transition and read straight pits which are formed in the data area; and a controller, operatively coupled to the optical pickup, configured to control a reproduction of data read from the optical pickup.

15. The apparatus of claim 14, wherein the optical pickup is configured to read control information of the specific recording pattern.

16. The apparatus of claim 15, wherein the controller is further configured to control a reproduction of the data area based on control information read from the optical pickup, the major information being recorded on a sub-area of the lead-in area.

17. The apparatus of claim 16, further comprising:

a servo configured to control a servo operation of the optical pickup using at least one of push-pull method in such a manner that a difference of signals detected from photo detector of the optical pickup is used and differential phase detection method in such a manner that a phase difference of signals detected from the photo detector of the optical pickup.

18. A method for forming a read-only recording medium having a lead-in area, a data area and a lead-out area, comprising:

forming straight pits and wobbled pits in the lead-in area, wobbled pits having a specific recording pattern along a transition which is present within a predetermined recording section of the lead-in area, the transition being created by applying a phase modulation method to the specific recording pattern, and straight pits in the data area.

19. The method of claim 18, wherein the recording pattern are formed on a sub-area of the lead-in area, the specific recording pattern having control information recorded and stored thereon.

20. The method of claim 18, wherein wobbled pits define a plurality of recording sections, each recording section having a length of 36 T, where T corresponds to the length of a channel bit.

* * * * *